US008470280B2

(12) United States Patent
Tas

(10) Patent No.: US 8,470,280 B2
(45) Date of Patent: Jun. 25, 2013

(54) CALCIUM CARBONATE MICROTABLETS AND METHOD FOR THE PREPARATION THEREOF

(76) Inventor: Ahmet Cüneyt Tas, Ankara (TR)

(*) Notice: Subject to any disclaimer, the term of this patent is extended or adjusted under 35 U.S.C. 154(b) by 510 days.

(21) Appl. No.: 12/670,906

(22) PCT Filed: Aug. 3, 2007

(86) PCT No.: PCT/IB2007/053076
§ 371 (c)(1),
(2), (4) Date: May 4, 2010

(87) PCT Pub. No.: WO2009/019536
PCT Pub. Date: Feb. 12, 2009

(65) Prior Publication Data
US 2010/0215564 A1  Aug. 26, 2010

(51) Int. Cl.
*C01F 5/24* (2006.01)
(52) U.S. Cl.
USPC .................. 423/430; 423/414; 423/419.1
(58) Field of Classification Search
USPC ................. 423/430, 431, 414, 419.1
See application file for complete search history.

(56) References Cited

U.S. PATENT DOCUMENTS

2004/0234443 A1* 11/2004 Chen et al. ............... 423/432
2005/0106110 A1*  5/2005 Liu ........................... 424/49

FOREIGN PATENT DOCUMENTS

| DE | 298 371 A5 | 2/1992 |
| EP | 0 459 399 A1 | 4/1991 |
| JP | 10 053412 A | 2/1998 |
| JP | 2000 344517 A | 12/2000 |
| JP | 2005 336036 A | 12/2005 |
| JP | 2007 191453 A | 8/2007 |
| RU | 2218305 C1 * | 12/2003 |

OTHER PUBLICATIONS

RU 2218305 C1 Derwent Translation, Kobeleva et al., Dec. 2003.*
Wang et al., "Preparation of Uniform Needle-Like Aragonite Particles by Homogeneous Precipitation," 1999, Journal of Colloid and Interface Science, 218, pp. 545-553.*
Grasby, "Naturally precipitating vaterite (u-CaCO3) spheres: Unusual carbonates formed in an extreme environment," 2003, Geochimica et Cosmochimica Acta, vol. 67, No. 9, pp. 1659-1666.*

* cited by examiner

*Primary Examiner* — Melvin Curtis Mayes
*Assistant Examiner* — Melissa Stalder
(74) *Attorney, Agent, or Firm* — Brinks Hofer Gilson & Lione

(57) ABSTRACT

The invention discloses a method of preparing monodisperse microtablets of calcium carbonate in aqueous solutions containing calcium, gelatin and urea. Calcium carbonate powders of a unique tablet-like morphology were produced by simply ageing the prerefrigerated (at 4° C. for at least 24 hours) $CaCl_2$-gelatin-urea solutions at 70° C. for 24 h in ordinary glass media bottles. Thermal decomposition of dissolved urea was used to supply aqueous carbonate ($CO_3^{2-}$) ions to the calcium ($Ca^{2+}$) ion and gelatin-containing solutions. Monodisperse $CaCO_3$ microtablets have the particle sizes from 1 to 8 microns. $CaCO_3$ microtablets were biphasic in nature and consist of 93 to 98% vaterite and 2 to 7% calcite. Identical solutions used without prerefrigeration yielded only trigonal prismatic calcite crystals upon ageing at 70° C. for 24 h.

3 Claims, 3 Drawing Sheets

CALCIUM CARBONATE MICROTABLETS AND METHOD FOR THE PREPARATION THEREOF

FIELD OF THE INVENTION

The present invention relates to the monodisperse, nonagglomerated microparticles of calcium carbonate in the form of perfect tablets or pills and their preparation method based on prerefrigerating the solution containing calcium, gelatin and urea.

BACKGROUND OF THE INVENTION

Calcium carbonate ($CaCO_3$) is an important material of marine and geological biomineralization processes. $CaCO_3$ powders are also widely used in pharmaceuticals (commonly as a calcium supplement or as an antacid), cosmetics, toothpaste, biomedical, rubber, plastic, paper making, printing ink, and food industries.

Calcium carbonate has three naturally occurring anhydrous polymorphs; calcite, aragonite and vaterite. Amorphous calcium carbonate (ACC), calcium carbonate monohydrate ($CaCO_3.H_2O$) and calcium carbonate hexahydrate ($CaCO_3.6H_2O$) may be regarded as the fourth, fifth and sixth polymorphs of calcium carbonate. At the ambient temperature and pressure, calcite is the most stable and abundant polymorph of calcium carbonate, while vaterite ($\mu$-$CaCO_3$), named after Heinrich Vater, is known to be the least stable among the anhydrous polymorphs.

Vaterite, which is regarded as a precursor of calcite or aragonite, has a hexagonal crystal structure with the space group $P6_3/mmc$ (No. 194) and $a=b=4.13$ Å, $c=8.49$ Å, $\alpha=\beta=90°$, and $\gamma=120°$. Vaterite has the theoretical density of 2.66 g/cm$^3$. Calcite, on the other hand, is rhombohedral with the space group R-3c (No. 167) and $a=b=4.990$ Å, $c=17.061$ Å, $\alpha=\beta=90°$, and $\gamma=120°$. In contrast to that of vaterite, calcite has a theoretical density of 2.71 g/cm$^3$. Vaterite has a higher aqueous solubility than calcite and aragonite; however is the least stable polymorph among those. Owing to its instability, vaterite is rare in nature as it would readily convert into one of the more stable calcium carbonate phases, typically, calcite and possibly to monohydrocalcite ($CaCO_3.H_2O$) or hexahydrate ($CaCO_3.6H_2O$). It is known from the prior art that in a solution supersaturated with respect to amorphous calcium carbonate, amorphous calcium carbonate forms first which transforms within minutes into vaterite and into calcite within several hours at room temperature.

Although vaterite is known to be rare in nature, an extremely important discovery was revealed lately that spheres of vaterite 0.5 to 10 μm in diameter (of inorganic origin) were forming in situ at a supraglacial sulphur spring located in the Canadian High Arctic. The unusual conditions of the site, including an extremely cold climate and the presence of supersaturated alkaline waters, must be noted for being responsible from preserving this unstable polymorph of calcium carbonate.

Calcium carbonate can be synthesized in the form of spheres (typically in the vaterite form), prismatic/trigonal/scalenohedral crystals (for the calcite polymorph) and needle- or plate-like crystals for its aragonite polymorph. Calcium carbonate synthesis methods involve in common, carbonation of the calcium ion ($Ca^{2+}$)—aqueous solution of a calcium salt in general—by the carbonate ($CO_3$) ion from a proper carbonate source. A widely used carbonation method in forming calcite/vaterite polymorphs is the carbon dioxide ($CO_2$) gas bubbling. The method involves bubbling $CO_2$ gas through a solution containing dissolved $Ca^{2+}$ ions. A method for producing vaterite particles of spherical, ellipsoidal or plate-like morphology is disclosed in the patent document U.S. Pat. No. 5,275,651. The method involves preparing a mixture containing water, methanol and either unslaked lime or both unslaked/slaked lime, and letting $CO_2$ bubbles through the said mixture which leads to formation of vaterite particles. The nanofibre and nanoplate type calcium carbonate particles and their preparation method are disclosed in patent application US 2004/0166047. Said calcium carbonate particles are formed by carbonation of milk of lime in the presence of a crystallization controller selected from polyaspartic acid, dioctyl sodium sulphosuccinate, polyacrylic acid and citric acid. The resultant calcium carbonate particles are in the form of nanofibres of nanorosary or faggot type, or in the form of nanoplates of accordions.

Using dissolved sodium carbonate (either $Na_2CO_3$ or $NaHCO_3$) as the $CO_3^{2-}$ source, in place of $CO_2$ gas bubbling, is another practical option to produce calcium carbonate powders of the vaterite or calcite form in aqueous solutions. An example utilizing this method can be found in the patent document RU 2218305. The method includes simultaneous feeding of reagent containing ions of calcium, and the carbonating reagent into a reacting agitated mixture. The reagent containing calcium ions is an aqueous solution of calcium chloride ($CaCl_2$), and the carbonating reagent is an aqueous solution of sodium carbonate ($Na_2CO_3$). The resultant product of is the fine-grained calcium carbonate particles with the average particle size of 1.8-22 micron with spherical form.

Urea ($CH_4N_2O$) can also be used as the carbonating agent because of its decomposition in aqueous solutions is accompanied by the slow and controlled supply of ammonia ($NH_3$) and carbon dioxide ($CO_2$) into the solution. It is known that urea decomposition kinetics is affected by temperature and concentration (of urea and cations present). Therefore, urea was also used (in place of $CO_2$ gas bubbling or $Na_2CO_3$, $NaHCO_3$ and $(NH_4)_2CO_3$ additions) to produce calcium carbonate powders. Wang et al. showed that non-agglomerated calcite, vaterite and aragonite particles can be produced by using the decomposition of urea in $CaCl_2$-containing aqueous solutions (50 to 90° C.). (Wang L F, Sondi I, Matijevic E. *Preparation of uniform needle-like aragonite particles by homogeneous precipitation. J Colloid Interf Sci* 1999; 218: 545-53)

It should be noted that none of the techniques cited above could go beyond the already known forms of calcium carbonate, "sphere" for vaterite and "rhombohedra/trigonal prisms/scalenohedra" for calcite. The study of Guo et al, on the other hand, which reported the crystallization habit of $CaCO_3$ in the presence of sodium acrylate (in a solution containing $CaCl_2$, $(NH_4)_2CO_3$, and $K_2(SO_4)_2$ at 30° C.) was quite remarkable that it yielded "disc-shaped" spheres of vaterite or classic rhombohedra of calcite under different experimental conditions. (Guo Y, Yang L, Yang X, Zhang X, Zhu S, Jiang K. *Effect of self-assembly of sodium acrylate on the crystallization of calcium carbonate. Macromol Biosci* 2003; 3:163-68.) Wakayama et al., upon immersing chitosan-coated glass slides into a solution of Ca-acetate and polyacrylic acid (PAA) in the presence of supercritical $CO_2$ at 50° C. and 76.5 kg/cm$^2$ (7.5 MPa), observed the formation of heavily agglomerated but "rounded, tablet-like" particles of vaterite deposited on the chitosan-coated glass slides. (Wakayama H, Hall S R, Mann S. *Fabrication of $CaCO_3$-biopolymer thin films using supercritical carbon dioxide. J Mater Chem* 2005; 15:1134-36). These studies were quite important in the sense that they betrayed the particle morphology is remarkably affected by the experimental conditions.

SUMMARY OF THE INVENTION

The morphology of perfect tablets and/or pills could not be achieved thus far not only for calcium carbonate but for any of the inorganic materials. In nature as well, such a tablet morphology was not encountered.

It is an object of this invention to provide monodisperse, nonagglomerated microparticles of calcium carbonate with the morphology of perfect tablets and/or pills. Synthesis of microtablets was achieved upon prerefrigerating the aqueous solution of calcium ions ($Ca^{2+}$), simultaneously containing gelatin and urea. Prerefrigerated, initially transparent and precipitate free calcium chloride ($CaCl_2$)-gelatin-urea solutions, when simply aged at 70° C. in sealed glass bottles, produced monodisperse, biphasic vaterite-calcite microtablets with a unique morphology. The resultant biphasic mixture was composed of about 93 to 98% vaterite and 2 to 7% calcite. Monodisperse calcium carbonate tablets had the particle sizes from 1 to 8 microns.

Identical solution without prerefrigeration yielded in trigonal, prismatic calcium carbonate of the single phase calcite form. The present invention therefore betrayed that the prerefrigeration has a remarkable effect on the calcium carbonate particle morphology.

DETAILED DESCRIPTION OF THE INVENTION

In this invention, urea is utilized as the carbonating agent in a calcium ion ($Ca^{2+}$) containing aqueous solution, preferable calcium chloride ($CaCl_2$) in which gelatin is simultaneously involved.

Urea ($CH_4N_2O$) decomposes into ammonia ($NH_3$) and carbon dioxide ($CO_2$) in aqueous solutions; which results, in this invention, in $CaCO_3$ formation by carbonation of $Ca^{2+}$ ions in a $CaCl_2$ containing solution. Urea decomposition kinetics is affected by the temperature and the concentration. In this invention the aging temperature was deliberately maintained low at 70° C. to avoid the instantaneous and rapid decomposition of urea, and to provide a much slower supply of $HCO_3^-$ ions to the Ca-gelatin solutions.

Gelatin is a biopolymer consisting of denaturated collagen which is actually a protein. It is known from the prior art that in the case of gelatin-water system the conformational coil-helix transition of the protein chains was responsible for the gel formation and the helix formation was enhanced by lowering the temperature to about 5° C. Upon cooling pure gelatin below its melting temperature (where the melting point of bovine gelatin is 36° C.), ordered structures of the gelatin molecules are re-formed. In other words, gelatin molecules, in coils, may partially revert to the ordered triple helical collagen-like sequences upon cooling. When the gelatin sols were cooled to around 5° C., the helix amount was known to increase (from zero at 35° C.) to about 65%. An annealing time (at 5° C.) of at least 6 h is necessary to achieve the above-mentioned coil-to-helix transformation. It is also known from the prior art that renaturation (achieved by the cooling of gelatin sols) is essentially a nonequilibrium, "non-reversible" process, and the triple helical sequences are stable (stabilized by the hydrogen bonds) in aqueous solutions. This would mean that upon reheating the refrigerated gelatin sols to temperatures above its melting point not all of the triple helices formed will decompose into random coils. Gelatin used in this process could be either bovine, porcine or whale gelatin.

The interaction of gelatin with urea, in aqueous solutions, has been a scarcely studied topic, however, the article of Jana and Moulik provided an extremely valuable insight into this process. (Jana P K, Moulik S P. *Interaction of amino acids and gelatin with urea*. Indian J Biochem Biophys 1993; 30:297-305). The dissociation of amino acids in aqueous solution produces $H^+$ ions and urea is known to bind hydrogen ion to form Urea-$H^+$ adduct. Jana and Moulik [100] reported the experimental $H^+$ ion concentrations generated from a series of individual amino acid solutions (such as, Gly, Pro, Val, Gln, Ser, His, Trp, Arg and Asp) to decrease with an increase in urea concentration. Dissolved urea competes with water for the $H^+$ ion forming uranium ion ($UH^+$).

Figure 1:
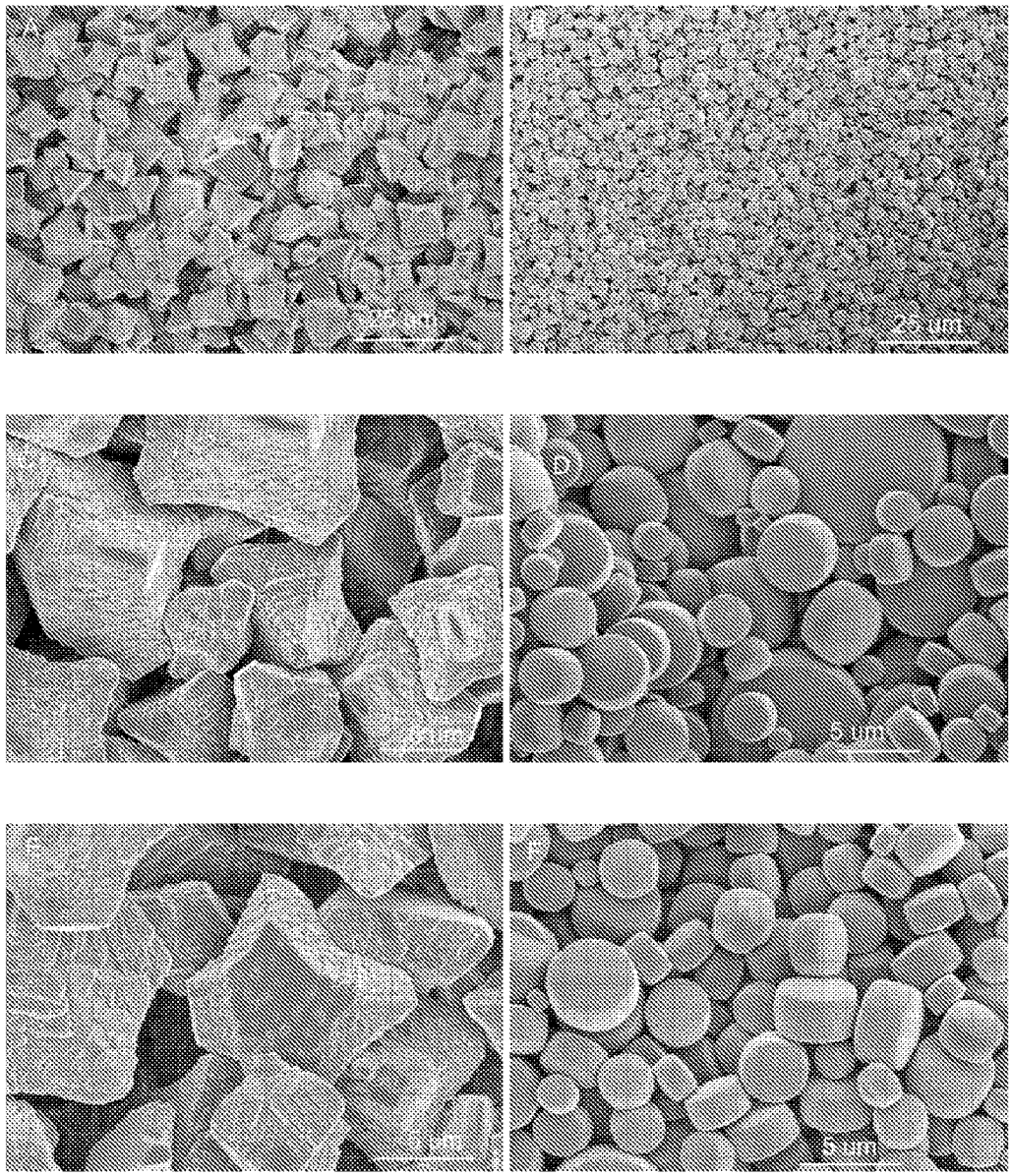
FIG. 1: Scanning electron microscope (SEM) photographs

The solution obtained via dissolution of $CaCl_2$ in deionized water, and addition of gelatin and urea respectively, is refrigerated at 4° C. for 24 hours. The solution is then aged at 70° C. for 24 hours, which later leads to biphasic calcium carbonate particles in the form of monodispersed microtablets. The microtablets composed of about 93 to 98% vaterite and 2 to 7% calcite. Microtablets have the particle sizes of 1 to 8 microns. The identical solution on the other hand, without prerefrigeration gave trigonal prismatic crystals of calcite polymorph. The comparative SEM photomicrographs of FIG. 1 depicted this drastic change in morphology which took place after prerefrigeration. FIGS. 1a-1b, 1c-1d and 1e-1f had identical photographic magnifications. FIGS. 1a, 1c and 1e showed the calcium carbonate particles produced when the freshly prepared $CaCl_2$-gelatin-urea solutions were directly heated at 70° C. for 24 h. On the other hand, FIGS. 1b, 1d, and 1f displayed the monodisperse calcium carbonate microtablets obtained when prerefrigerated (24 h at 4° C.) $CaCl_2$-gelatin-urea solutions were heated at 70° C. for 24 h. Particle sizes were determined by using the linear intercept method on the SEM photomicrographs. The average particle size in powders obtained from the as-prepared solutions was 7±1.5 μm (FIGS. 1a, 1c, 1e), whereas that obtained from the prerefrigerated solutions was 4±2.5 μm. The values reported here were the averages of 15 particle measurements along 6 lines drawn across each photomicrograph.

Figure 2:
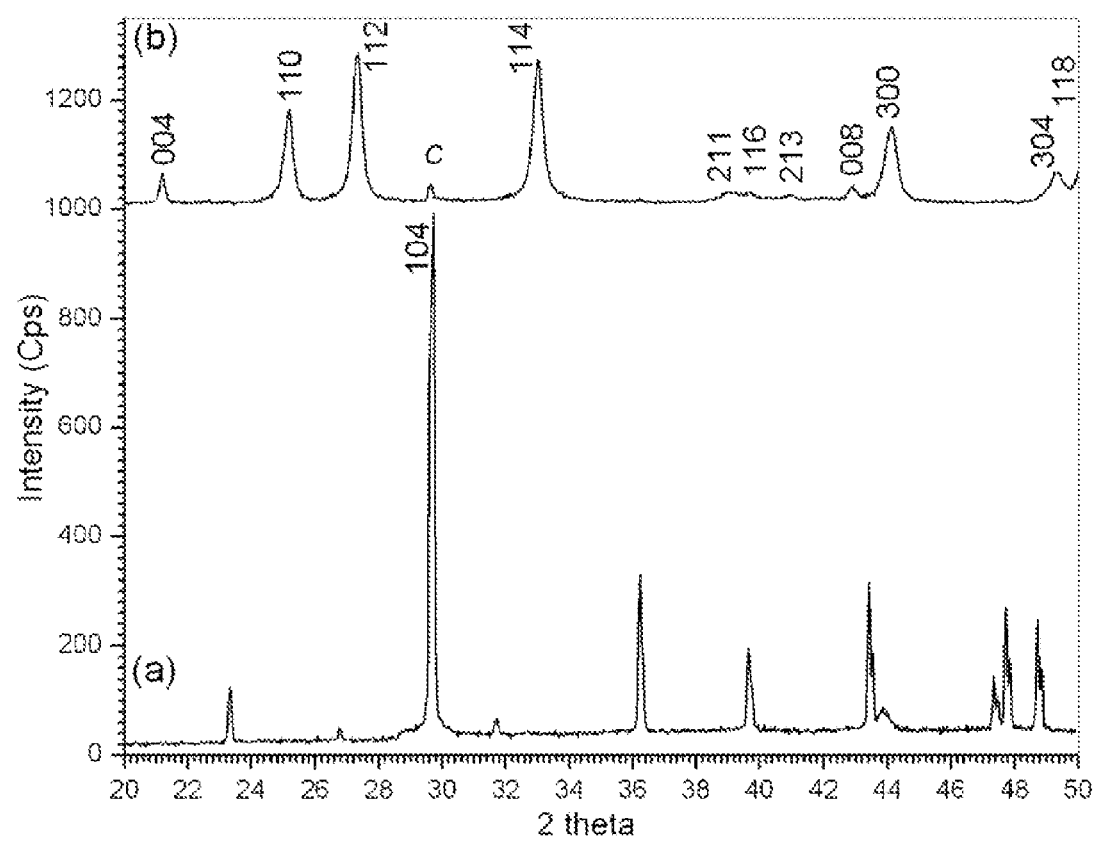
FIG. 2: XRD data of $CaCO_3$ particles produced after ageing at 70° C. for 24 h;
(a) from "as-prepared" $CaCl_2$-gelatin-urea solutions (single-phase calcite)
(b) from "prerefrigerated" (4° C., 24 h) $CaCl_2$-gelatin-urea solutions (biphasic vaterite-calcite, the only calcite peak was indicated by C)

The powder XRD traces of samples obtained from both the as-prepared and prerefrigerated solutions were shown in FIG. 2. As-prepared solutions, upon ageing at 70° C. for 24 h, produced single-phase trigonal prismatic calcite crystals, conforming to the ICDD PDF 5-0586 [81]. Prerefrigerated solutions, on the other hand, produced vaterite [82] microtablets contaminated with a minor amount of the calcite phase. The XRD data of the vaterite microtablets agreed well with the ICDD PDF 72-0506. The only calcite peak appeared in the XRD spectrum of vaterite microtablets was indicated by the letter C in the FIG. 2b trace. That peak corresponded to the most intense reflection of the calcite phase, i.e., (104).

Figure 3:
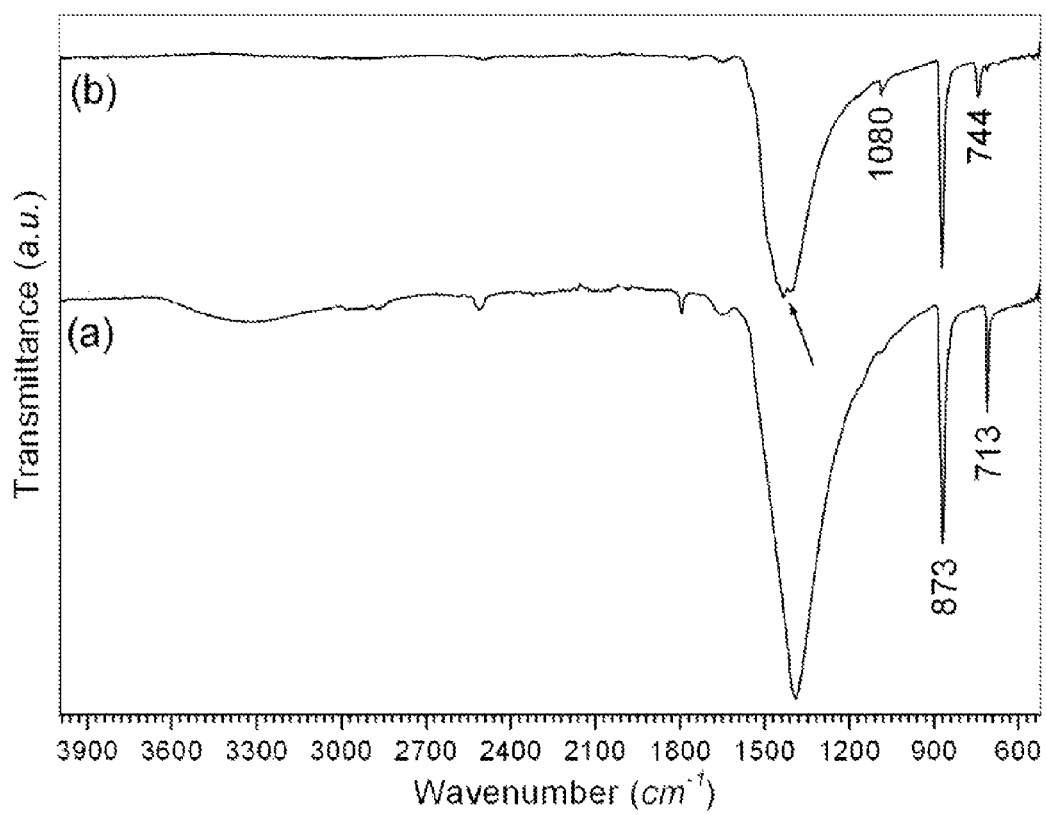
FIG. 3: FTIR spectra of $CaCO_3$ particles produced after ageing at 70° C. for 24 h;
(a) from "as-prepared" $CaCl_2$-gelatin-urea solutions
(b) from "prerefrigerated" (4° C., 24 h) $CaCl_2$-gelatin-urea solutions (arrow indicates the characteristic splitting for vaterite)

The FTIR spectra of both samples (trigonal prismatic calcite and vaterite microtablets) are depicted in FIG. 3. The trigonal prismatic calcite particles obtained from the as-prepared solutions contained some surface adsorbed water (at least at the moment of IR data collection) and this was indicated by the broad water band extending over the range of 3600 and 3100 $cm^{-1}$ (FIG. 2$a$). The H—O—H band observed at 1650 $cm^{-1}$ in FIG. 3$a$ was also pinpointing to this fact. The band observed at 1080 $cm^{-1}$, in both FIGS. 3$a$ and 3$b$, was assigned to the symmetric stretching, $v_1$, and lattice mode vibration. The strong carbonate band seen at 873 $cm^{-1}$ (out-of-plane bending, $v_2$) was common to both calcite and vaterite. However, based on the IR spectra, it is quite an easy task to distinguish between vaterite and calcite polymorphs. The absorption band at 713 $cm^{-1}$ is characteristic for calcite, whereas in vaterite the same band (in-plane bending, $v_4$) is shifted to 744 $cm^{-1}$ [32]. Moreover, in vaterite, the main carbonate band (i.e., asymmetric stretching, $v_3$) is split into two at 1450 and 1407 $cm^{-1}$ (indicated by an arrow in FIG. 3$b$). This carbonate band splitting was not seen in the case of pure calcite, and the asymmetric stretching band for calcite was observed at 1405 $cm^{-1}$.

The amount of calcite phase present in the monodisperse microtablets was determined by using both the XRD and the FTIR data according to the methods suggested by Rao [29, 60] and Andersen and Kralj [37], respectively, and the calcite phase was present at about 7±1%. Therefore, the monodisperse microtablets were biphasic in nature, i.e., 93% vaterite-7% calcite.

WORKING EXAMPLE

Ca-containing gelatin-urea solutions were prepared as follows: 200 mL of deionized water was placed into a 250 mL glass beaker and 11.761 g of $CaCl_2.2H_2O$ (>99%, Cat. No. C79-500, Fisher Scientific, Fairlawn, N.J.) was added to it, followed by stirring on a hot-plate, with a Teflon®-coated magnetic stir bar, at room temperature (RT: 21±1° C.). This solution thus contained 0.4 M $Ca^{2+}$. 0.30 g of gelatin powder (>99%, Cat. No. G7-500, Fisher Scientific) was then dissolved, by stirring at RT, in the above solution. Finally, 6.00 g of urea powder (>99%, $NH_2CONH_2$, Cat. No. U15-500, Fisher Scientific) was added to the above Ca-gelatin solution, and the solution was stirred at RT for a minute to dissolve the urea. The transparent solution, which contained 0.4 M $Ca^{2+}$, 0.5 M urea and 0.3 g gelatin, was then transferred into a 250 mL-capacity Pyrex® media bottle (Cat. No. 06-423-3B, Fisher Scientific). Since these solutions contained dissolved urea, and since urea starts going through a very slow decomposition process even at RT, such solutions are not supposed to be stored at RT for long times; therefore, these solutions must be prepared freshly prior to each synthesis experiment.

These solutions were then used to produce $CaCO_3$ particles with two different morphologies. "As-prepared solutions" and "prerefrigerated solutions" resulted in two different particle morphologies.

Synthesis of Trigonal Prismatic Calcite Crystals:

To produce trigonal, prismatic calcium carbonate (of the single-phase calcite form), only freshly prepared $CaCl_2$-gelatin-urea solutions (prepared in the way described above) were used. 200 mL of solution was first placed into a 250 mL-capacity Pyrex® media bottle. Then, one piece of microscope cover glass (Cat. No. 12-542B, 22×22×0.15 mm, Fisher Scientific) was dropped into the bottle and made sure that it laid flat at the bottom of the bottle. The bottle was tightly capped and placed into a microprocessor-controlled oven pre-heated to 70° C., and kept there undisturbed for 24 hours. At the end of 24 h, the bottle was opened; the white-coated cover glass was removed, and washed with an ample supply of deionized water, followed by rinsing with ethanol (95%, denatured, Cat. No. S73985, Fisher Scientific). The cover glass was dried in an oven at 37° C., overnight in air. For further analysis, the white powdery material coating the cover glass was gently scraped off by using a clean and sharp razor blade, when needed. The bottom of the glass bottle was also coated with the same material.

Synthesis of $CaCO_3$ Microtablets:

A freshly prepared portion (200 mL) of $CaCl_2$-gelatin-urea solution was placed in a 250 mL-capacity Pyrex media bottle, tightly capped and then refrigerated (at 4° C.) for 24 h. The pH of the refrigerated solution was measured to be 6.5 (at 6° C.). One piece of microscope cover glass was dropped into the bottle and made sure that it laid flat at the bottom of the bottle. The bottle was capped and placed into a microprocessor-controlled oven pre-heated to 70° C., and kept there undisturbed for 24 hours. At the end of 24 h (solution pH was 7.5 at 68° C.), the bottle was opened and the white-coated cover glass was removed, and washed with an ample supply of deionized water, followed by rinsing with ethanol. The cover glass was dried in an air atmosphere oven at 37° C., overnight. For further analyses, the white powdery material coating the cover glass was gently scraped off by using a clean and sharp razor blade. The bottom of the glass bottle was also coated with the same material.

Samples were characterized by powder X-Ray diffraction (XRD; Model XDS 2000, Scintag, Sunnyvale, Calif.), scanning electron microscopy (SEM; Model S-4700, Hitachi, Tokyo, Japan), and Fourier-transform infrared spectroscopy (FTIR; Nicolet 550, Thermo-Nicolet, Woburn, Mass.). Powder samples for SEM and XRD analyses (scraped off of the coated cover glasses) were first gently ground in an agate mortar by using an agate pestle and then sprinkled onto ethanol-damped single-crystal quartz sample holders to form a thin layer, followed by tapping to remove the excess of powder. The X-ray diffractometer was operated at 40 kV and 30 mA with monochromated Cu $K_\alpha$ radiation. XRD data (over the typical range of 20 to 50° 2θ) were collected with a step size of 0.03° and a preset time of 1 sec at each step. FTIR samples were first ground in a mortar, in a manner similar to that used in the preparation of XRD and SEM samples, then mixed with KBr powder in a ratio of 1:100, followed by forming a pellet by using a uniaxial cold press. 128 scans were performed at a resolution of 3 $cm^{-1}$. Coated glass covers examined with the scanning electron microscope (SEM) were sputter-coated with a thin Au layer, to impart surface conductivity to the samples.

The invention claimed is:

1. A method of preparing monodisperse microtablets of calcium carbonate ($CaCO_3$) comprising tablets having particle sizes in the range of 1 to 8 microns, wherein said method comprises the steps of:
    (a) dissolving calcium chloride dihydrate salt in deionized water at room temperature to obtain a solution containing aqueous $Ca^{2+}$ ions,
    (b) dissolving gelatin in the solution produced in step (a) at room temperature,
    (c) dissolving urea ($NH_2CONH_2$) in the solution produced in step (b) at room temperature,
    (d) placing the solution produced in step (c) into a glass container and thereafter tightly sealing the glass container,
    (e) refrigerating the solution of step (d) at 4° C. for a period of 24 hours, (f) heating the solution of step (e) at 70° for a period of 24 hours to form microtablets, (g) recovering the formed microtablets by filtering the solution produced in step (f), and (h) drying the microtablets from step (g) at 37° C. in an air atmosphere.

2. The method according to claim 1 wherein said microtablets of calcium carbonate consist of 93 to 98% vaterite and 2 to 7% calcite.

3. A method of preparing trigonal prismatic crystals of calcite, wherein said method comprises the steps of:

(a) dissolving calcium chloride dihydrate salt in deionized water at room temperature to obtain a solution containing aqueous $Ca^{2+}$ ions, (b) dissolving gelatin in the solution produced in step (a) at room temperature, (c) dissolving urea ($NH_2CONH_2$) in the solution produced in step (b) at room temperature, (d) placing the solution produced in step (c) into a glass container and thereafter tightly sealing the glass container, (e) heating the solution of step (d) at 70° for a period of 24 hours to form trigonal prismatic crystals of calcite, (f) recovering the formed trigonal prismatic crystals of calcite by filtering the solution produced in step (e), and (g) drying the trigonal prismatic crystals of calcite at 37° C. in an air atmosphere.

\* \* \* \* \*